(12) United States Patent
Takebayashi

(10) Patent No.: US 7,974,021 B2
(45) Date of Patent: Jul. 5, 2011

(54) LENS TUBE, OPTICAL DEVICE HAVING THE LENS TUBE, AND METHOD FOR PRODUCING THE LENS TUBE

(75) Inventor: Tatsuhide Takebayashi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/355,937

(22) Filed: Jan. 19, 2009

(65) Prior Publication Data

US 2009/0207503 A1 Aug. 20, 2009

(30) Foreign Application Priority Data

Feb. 18, 2008 (JP) .................................. 2008-036048

(51) Int. Cl.
*G02B 7/02* (2006.01)

(52) U.S. Cl. ...................... 359/811; 359/814; 359/822

(58) Field of Classification Search .................. 359/811
See application file for complete search history.

(56) References Cited

U.S. PATENT DOCUMENTS

| | | | | |
|---|---|---|---|---|
| 5,249,082 A | * | 9/1993 | Newman | 359/813 |
| 5,627,683 A | | 5/1997 | Takezawa | |
| 5,845,157 A | * | 12/1998 | Imura et al. | 396/55 |
| 6,008,954 A | * | 12/1999 | Shintani et al. | 359/704 |
| 7,129,472 B1 | * | 10/2006 | Okawa et al. | 250/234 |
| 2005/0036056 A1 | * | 2/2005 | Ikemachi et al. | 348/335 |
| 2005/0275315 A1 | * | 12/2005 | Manabe et al. | 310/328 |

FOREIGN PATENT DOCUMENTS

| | | |
|---|---|---|
| JP | 8-297234 | 11/1996 |
| JP | 2005-029246 | 2/2005 |
| JP | 2005-077712 | 3/2005 |
| JP | 2005-077713 | 3/2005 |
| JP | 2005-077714 | 3/2005 |

* cited by examiner

*Primary Examiner* — Jessica T Stultz
(74) *Attorney, Agent, or Firm* — Ditthavong Mori & Steiner, P.C.

(57) ABSTRACT

A lens tube includes a standard member, a lens, a guide, and a pushing member. The standard member has a standard surface via which the standard member is to be mounted to a camera main body. The lens retainer retains at least one lens and is connected to the standard member movably along an optical axis of the at least one lens. The guide is provided facing the lens retainer in a radial direction of the at least one lens to guide the lens retainer along the optical axis. The pushing member pushes the lens retainer and the guide in opposite directions.

17 Claims, 5 Drawing Sheets

LENS TUBE, OPTICAL DEVICE HAVING THE LENS TUBE, AND METHOD FOR PRODUCING THE LENS TUBE

CROSS-REFERENCE TO RELATED APPLICATIONS

The present application claims priority under 35 U.S.C. §119 to Japanese Patent Application No. 2008-036048, filed Feb. 18, 2008. The contents of this application are incorporated herein by reference in their entirety.

BACKGROUND OF THE INVENTION

1. Field of the Invention

The present invention relates to a lens tube, an optical device having the lens tube, and a method for producing the lens tube.

2. Discussion of the Background

Conventionally, as a lens tube, a lens tube which pushes a lens which moves to an optical axis direction to an optical axis direction using a coil spring so as to suppress rattling of the lens is known (for example, see Japanese Patent Application Laid-Open No. 8-297234). The contents of Japanese Patent Application Laid-Open No. 8-297234 are incorporated herein by reference in their entirety.

SUMMARY OF THE INVENTION

According to one aspect of the present invention, a lens tube includes a standard member, a lens, a guide, and a pushing member. The standard member has a standard surface via which the standard member is to be mounted to a camera main body. The lens retainer retains at least one lens and is connected to the standard member movably along an optical axis of the at least one lens. The guide is provided facing the lens retainer in a radial direction of the at least one lens to guide the lens retainer along the optical axis. The pushing member pushes the lens retainer and the guide in opposite directions.

According to another aspect of the present invention, an optical device includes the lens tube as described above.

According to a further aspect of the present invention, a method for producing a lens tube includes providing a standard member having a standard surface via which the standard member is to be mounted to a camera main body. The lens retainer is connected to the standard member movably along an optical axis of the at least one lens, the lens retainer retaining at least one lens. The guide is provided facing the lens retainer in a radial direction of the at least one lens to guide the lens retainer along the optical axis. The pushing member is provided to push the lens retainer and the guide in opposite directions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
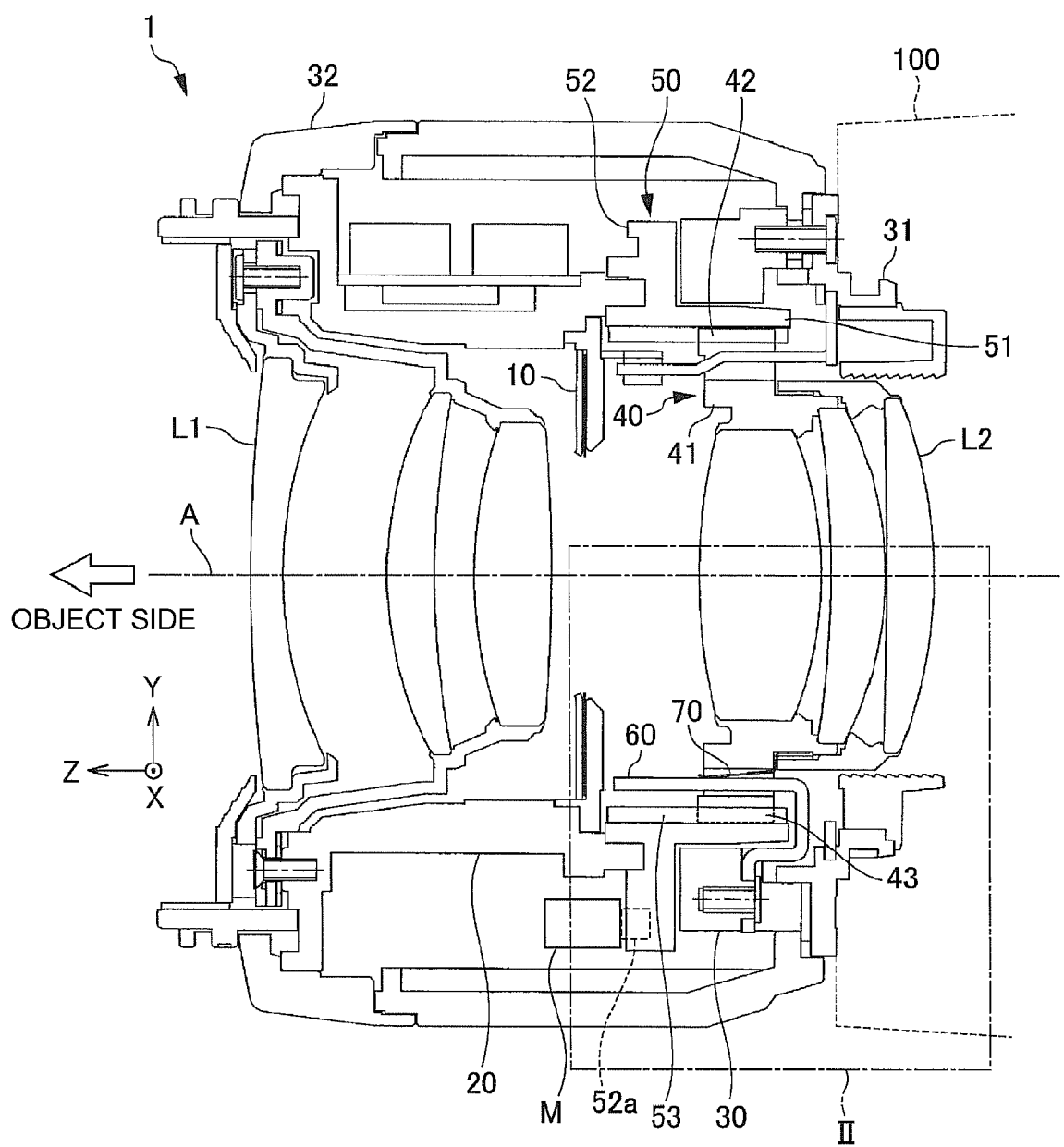
FIG. 1 is a cross-sectional view including an optical axis of a lens tube according to a first embodiment of the present invention.

The embodiments will now be described with reference to the accompanying drawings, wherein like reference numerals designate corresponding or identical elements throughout the various drawings.

First Embodiment

A lens tube according to a first embodiment of the present invention is described below with reference to the drawings.

FIG. 1 is a cross-sectional view including an optical axis of the lens tube according to the first embodiment.

Figure 2:
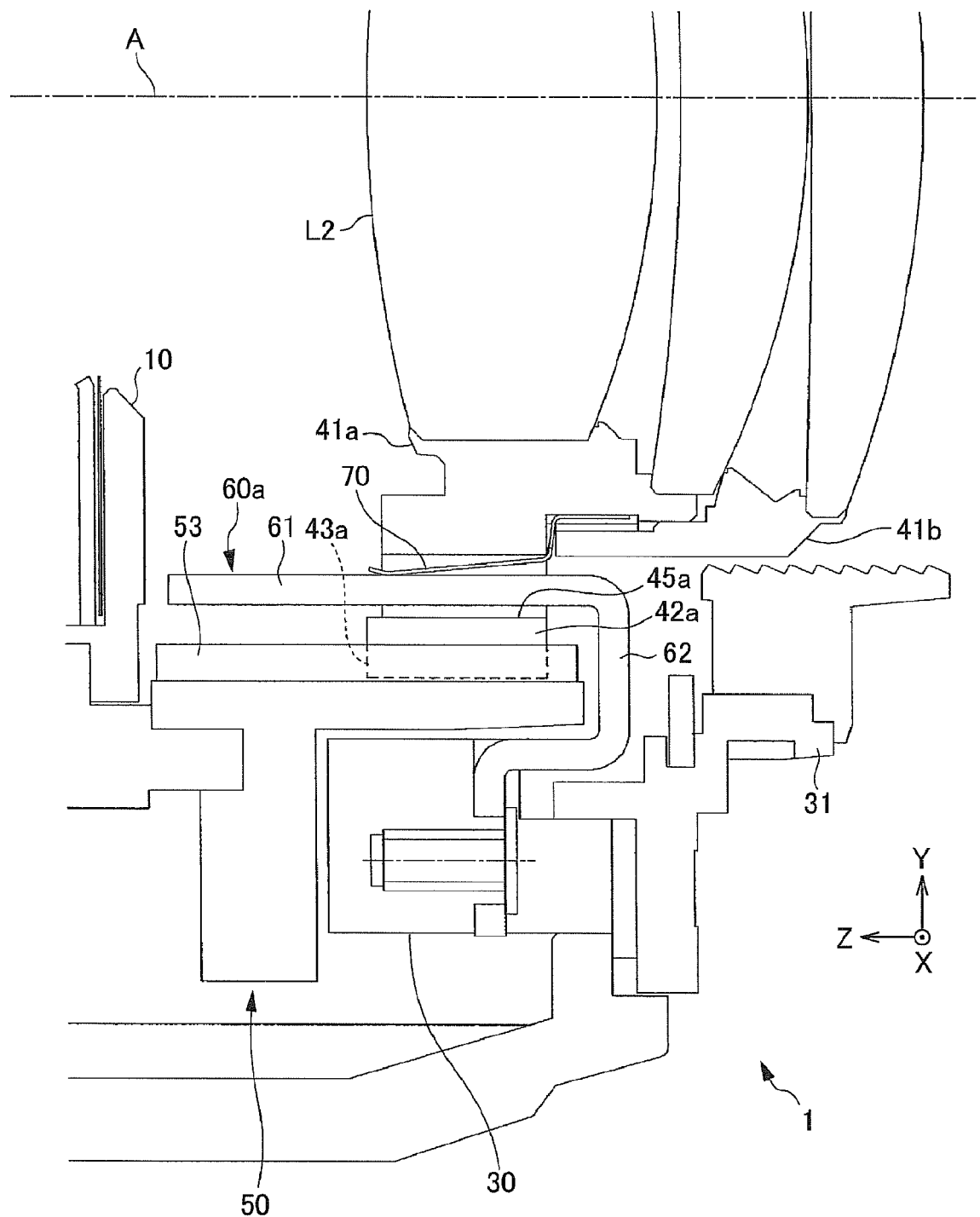
FIG. 2 is an enlarged diagram illustrating portion II of the lens tube shown in FIG. 1.

FIG. 2 is an enlarged diagram illustrating an II portion of the lens tube shown in FIG. 1.

Figure 3:
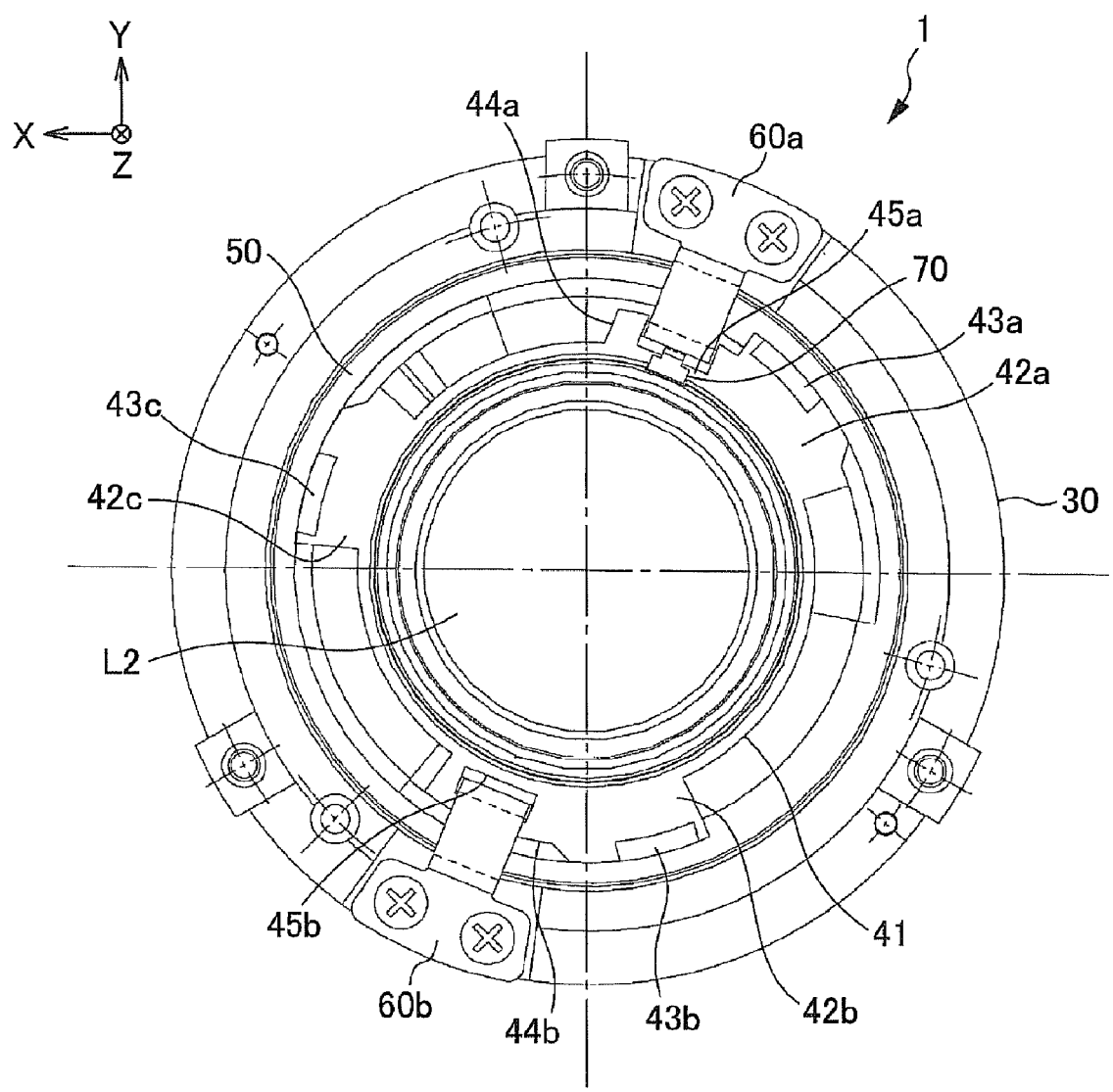
FIG. 3 is a diagram when the lens tube shown in FIG. 1 is viewed from a camera body side in an optical axis direction.

FIG. 3 is a diagram when the lens tube shown in FIG. 1 is viewed from a camera body side in an optical axis direction.

For easy understanding, in FIGS. 1 to 3, a three-dimensional coordinate system composed of an X axis, a Y axis and a Z axis is set.

The lens tube 1 is an interchangeable lens tube which is mounted to a camera body 100 detachably, and has a first lens group L1, a second lens group L2, a diaphragm unit 10, a fixing tube 20, a reinforcing ring 30, a two-group retaining frame 40, a gear ring 50, a straight guide key 60, and a friction spring 70.

The first lens group L1 and the second lens group L2 form a photographing optical system which leads object light to a photographing section, not shown, provided to the camera body 100. An optical axis A of the photographing optical system is parallel with a Z axis shown in the drawing.

The first lens group L1 is fixed to an end portion on an object side of the lens tube 1 in an optical axis direction. The second lens group L2 is disposed on a camera body side in the optical axis direction with respect to the first lens group L1, and can advance and retreat to the optical axis direction. In the lens tube 1, when the second lens group L2 is advanced or retreated to the optical axis direction, so that a focusing state of the photographing optical system is adjusted. As a result, the photographing optical system focuses on a main object.

The diaphragm unit 10 adjusts a light amount of object light passing through the photographing optical system formed by the first lens group L1 and the second lens group L2. The diaphragm unit 10 is disposed between the first lens group L1 and the second lens group L2. The diaphragm unit 10 includes a publicly-known splendor diaphragm device having a plurality of diaphragm blades.

Transfer of the fixing tube 20 with respect to the camera body 100 is limited in a state that the lens tube 1 is attached to the camera body 100.

The reinforcing ring 30 is a circular member which is connected to an end portion of the fixing tube 20 on the camera body side in the optical axis direction. A lens mount 31 for connecting the lens tube 1 to the camera body 100 is fixed to the reinforcing ring 30 by a screw.

The two-group retaining frame 40 is a frame which retains the second lens group L2, and is entirely formed into a circular shape. The two-group retaining frame 40 has a main body section 41 which is a portion for retaining the second lens group L2, and a projected section 42 which is projected from an outer peripheral surface of the main body section 41 to an outer diameter side. For example, the three projected sections 42 (42a, 42b and 42c) are formed around the optical axis at approximately uniform intervals as shown in FIG. 3. Male helicoids 43 (43a, 43b and 43c) are formed on front end portions of the projected portions 42, respectively, and these male helicoids 43 are screwed into female helicoids 53 formed on the gear ring 50, described later.

The main body section 41 has a first main body section 41a and a second main body section 41b as shown in FIG. 2. The first main body section 41a and the second main body section 41b are cylindrical members whose outer diameters are approximately the same, and the first main body section 41a is disposed on a side in the optical axis direction closer to the object than the second main body section 41b. The projected sections 42 are integrally formed with the first main body section 41a.

An external diameter of an end portion of the first main body 41a on a camera body side in the optical axis direction is smaller than that of the other portion, and male screws are formed on an outer peripheral surface in an area where the external diameter is smaller. On the other hand, female screws are formed on an inner peripheral surface of an end portion of the second main body section 41b on an object side in the optical axis direction. The first main body section 41a and the second main body section 41b are assembled by fitting the first main body section 41a into the second main body section 41b.

The two-group retaining frame 40 has a pair of sections to be guided 44 (44a and 44b) projected from the outer peripheral surface of the first main body section 41a to an outer diameter side (see FIG. 3). The sections to be guided 44 are formed with the through holes 45 (45a and 45b) through which the straight guide key 60, described later, passes. The through holes 45 prescribe a transfer direction of the two-group retaining frame 40 to a direction parallel with an optical axis A. The section to be guided 44a is formed continuously with one (42a) of the three projected sections 42, and the other section to be guided 44b is formed continuously with the another one (42b) of the three projected sections 42.

The gear ring 50 is a member which transmits an output from a ultrasonic motor M (see FIG. 1) and a rotational force of a focus operating ring 32 to the two-group retaining frame 40. The gear ring 50 has a main body section 51 as a cylindrical portion disposed on an inner diameter side of the reinforcing ring 30, and a flange section 52 projected from an outer peripheral surface of the main body section 51 into a flange shape as shown in FIG. 1. The female helicoids 53 into which the male helicoids 43 provided to the two-group retaining frame 40 are screwed are formed on an inner peripheral surface of the main body section 51.

A gear, not shown, is formed on the flange section 52, and outputs (rotational forces) from the ultrasonic motor M and the focus operating ring 32 are transmitted to this gear via a reduction gear 52a. The gear ring 50 rotates around the optical axis with it interlocked with the ultrasonic motor M and the focus operating ring 32.

The straight guide keys 60 (60a and 60b) are members which guide the two-group retaining frame 40 straight to the optical axis direction, and are formed by bending belt-shaped sheet metal members into an approximately L shape.

The straight guide key 60 has a guide 61 which extends parallel with the optical axis A, and a fixing section 62 which is formed continuously with an end portion of the guide 61 on a camera body side in the optical axis direction and extends to a radial direction of the lens tube 1 (hereinafter, simply the radial direction) as shown in FIG. 2. In the straight guide key 60, the fixing section 62 is fixed to the reinforcing ring 30 by a screw (see FIG. 3).

A pair of the straight guide keys 60 is provided via the second lens group L2 as shown in FIG. 3. The guide 61 of the one straight guide key 60a passes through the through hole 45a of the one section to be guided 44a, and the guide 61 of the other straight guide key 60b passes through the through hole 45b of the other section to be guided 44b.

The friction spring 70 is a cantilever leaf spring which suppresses ratting of the two-group retaining frame 40 and is formed by a belt-shaped sheet metal member.

An area on the fixed end side of the friction spring 70 is inserted between the first main body section 41a and the second main body section 41b forming the two-group retaining frame 40 so as to be fixed to the two-group retaining frame 40 as shown in FIG. 2. An area on a free end side of the friction spring as well as the one straight guide key 60a is inserted into the through hole 45a formed on the projected section 43 of the two-group retaining frame 40. The area of the free end side generates a pushing force to a direction where the two-group retaining frame 40 and the straight guide key 60a are separated from each other.

In the lens tube 1 according to the first embodiment, a driver including the ultrasonic motor M operates according to an autofocus instruction signal generated from the camera body 100 or the focus operating ring 32 is operated by a photographer, so that the gear ring 50 rotates about the optical axis. Since the rotation of the two-group retaining tube 40 about the optical axis is limited by the straight guide key 60, when the gear ring 50 rotates, the two-group retaining frame 40 is guided by the helicoid so as to advance straight to the optical axis direction.

With the lens tube 1 according to the first embodiment, the following effects can be produced.

(1) A minute gap (seam) is formed between the two-group retaining frame 40 and the straight guide key 60 so as to smooth their sliding operations. For example, when a posture of the camera body 100 is changed between a vertical position and a lateral position, the two-group retaining frame 40 changes due to its empty weight in the gap. A focus which is adjusted when the camera body 100 is in the vertical position might be displaced due to change in the position of the camera body 100 into the lateral position.

On the contrary, in the lens tube 1 according to this embodiment, the friction spring 70 pushes the straight guide key 60 and the two-group retainer 40 to a direction where they are separated from each other. For this reason, the rattling of the two-group retaining frame 40 with respect to the straight guide key 60 can be suppressed by a frictional force between the straight guide key 60a and the friction spring 70. Therefore, an out-of-focus state can be prevented by the change in the posture of the camera body 100.

(2) Since the friction spring 70 generates a pushing force to the direction where the two-group retaining frame 40 and the straight guide key 60 are separated from each other, the pushing force is constant regardless of the position of the second lens group L2 in the optical axis direction. Therefore, the control of the ultrasonic motor is easy, and the second group lens group L2 can be stably driven. Since also a load which is felt at the time when the photographer manually operates the focus operating ring 32 is constant regardless of the position of the second lens group L2, operability at the time of the manual focus is improved.

(3) Since the friction spring 70 is a leaf spring, its pushing force (spring constant) is easily tuned so as not to become resistance (load) at the time when the straight guide key 60a and the friction spring 70 slide.

(4) The friction spring 70 is allowed to touch the straight guide key 60 which is always opposed to the two-group retaining frame 40 in the radial direction within a movable range of the two-group retaining frame 40. For this reason, a new member does not have to be provided in order to suppress the rattling of the two-group retaining frame 40.

Second Embodiment

The lens tube according to a second embodiment of the present invention is described below. In the second embodiment, parts which function similarly to the parts in the first embodiment are denoted by the same reference symbols or the same tail end, and overlapped description and drawings are suitably not repeated.

Figure 4:
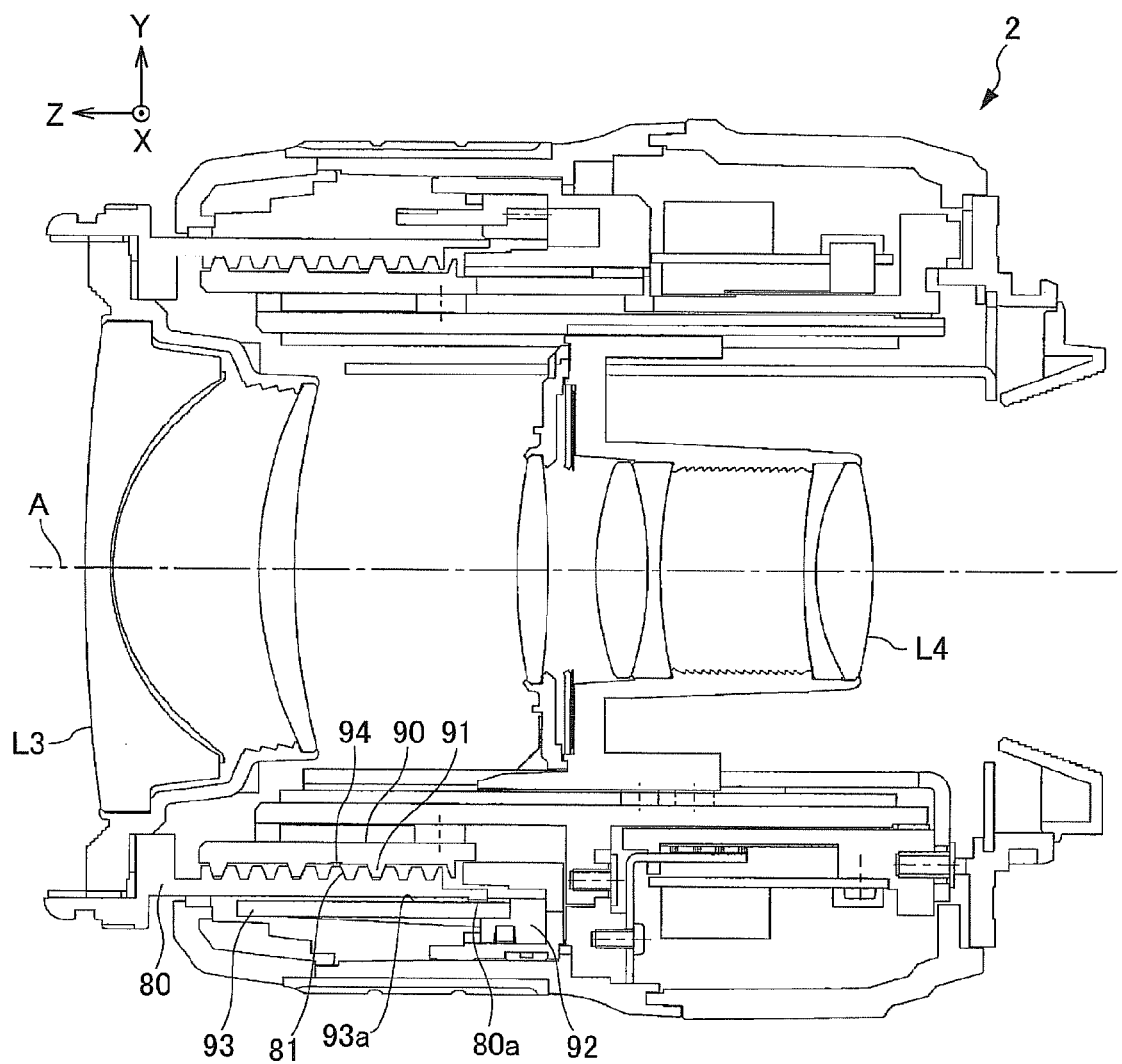
FIG. 4 is a cross-sectional view including the optical axis of the lens tube according to a second embodiment.

FIG. 4 is a cross-sectional view including the optical axis of the lens tube according to the second embodiment.

Figure 5A:
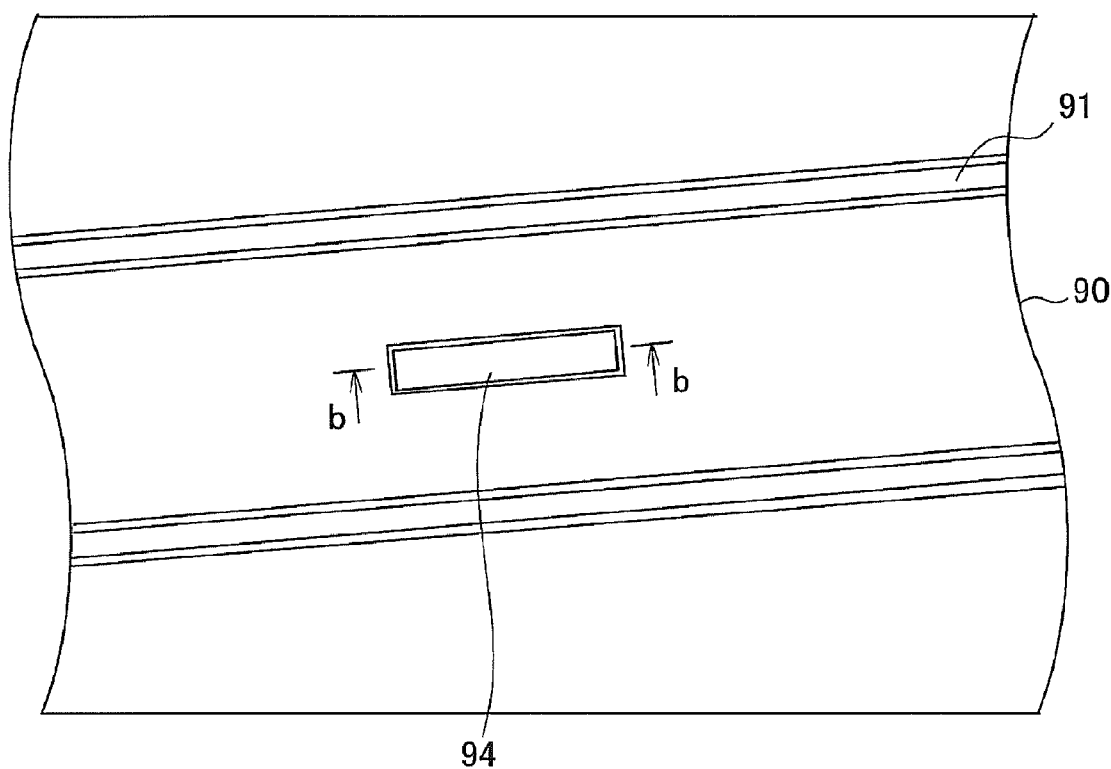
FIGS. 5A and 5B are diagrams illustrating a guide tube provided to the lens tube shown in FIG. 4.
Figure 5B:
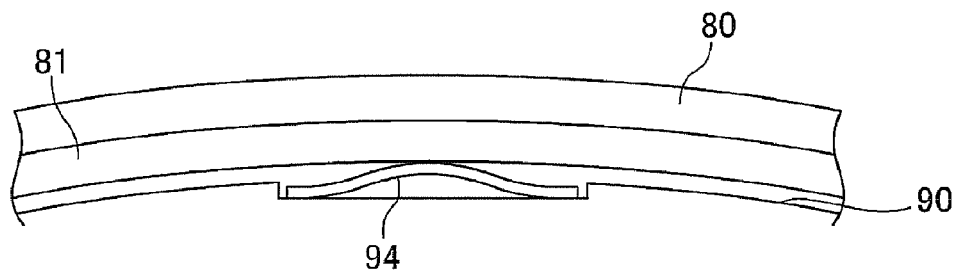

FIG. 5 illustrates a guide tube provided to the lens tube shown in FIG. 4, and FIG. 5A is a developed diagram of the outer peripheral surface, and FIG. 5B is a fragmentary sectional view taken along line b-b of FIG. 5A.

In the lens tube 1 according to the first embodiment, the first lens group L1 is fixed, but in a lens tube 2 according to the second embodiment, both a first lens group L3 and a second lens group L4 can advance or retreat in the optical axis direction. In the lens tube 2, when the second lens group L4 advances or retreats in the optical axis direction, a focal distance is changed (zoomed), and when the first lens group L3 advances or retreats in the optical axis direction, the first lens group L3 focuses on an object.

A driving mechanism of the first lens group L3 is described below.

The lens tube 2 according to the second embodiment has a one-group retaining tube 80 which retains the first lens group L3. A female helicoid 81 is formed on an inner peripheral surface of the one-group retaining tube 80.

A guide tube 90 is disposed on an inner diameter side of the one-group retaining tube 80. A male helicoid 91, which is screwed into the female helicoid 81 provided to the one-group retaining tube 80, is formed on an outer peripheral surface of the guide tube 90.

In the lens tube 2 according to the second embodiment, an output from the ultrasonic motor (not shown) for driving the first lens group L3 is transmitted to a gear ring 92. At this time, the guide tube 90 does not rotate.

When the gear ring 92 rotates about the optical axis, an arm member 93 formed integrally with the gear ring 92 rotates with it interlocked with this. Transfer of the gear ring 92 and the arm member 93 to the optical axis direction is limited. A guide groove 93*a* which extends approximately parallel with the optical axis A is formed on the arm member 93, and an engaging protrusion 80*a* formed on an outer peripheral surface of the one-group retaining tube 80 is inserted into the guide groove 93*a*. As a result, when the gear ring 92 and the arm member 93 rotate about the optical axis, the one-group retaining tube 80 rotates integrally with them and is guided by the helicoid so as to advance or retreat in the optical axis direction.

A thread pitch of the male helicoid 91 formed on the outer peripheral surface of the guide tube 90 is larger than a thread pitch of the female helicoid 81 formed on the one-group retaining tube 80, and a plane section is formed between the threads of the male helicoid 91 provided to the guide tube 90. A friction spring 94 is mounted to the plane section of the guide tube 90.

As shown in FIG. 5B, the friction spring 94 is a leaf spring obtained by machining a rectangular sheet metal member, and its both ends are allowed to touch the guide tube 90 with a middle portion in a longitudinal direction being deflected.

The middle portion of the friction spring 94 in the longitudinal direction pressure-contacts with an apex of the thread of the female helicoid 81 formed on the one-group retaining tube 80. The friction spring 94 generates a pushing force to a direction where the one-group retaining tube 80 and the guide tube 90 are separated from each other.

As shown in FIG. 5A, the longitudinal direction of the friction spring 94 is approximately parallel with a direction where the helicoid extends, and even when the one-group retaining tube 80 rotates, the friction spring 94 always pressurizes the apex of the helicoid (thread) of the one-group retaining tube 80.

The friction spring 94 is provided only to one place on the outer peripheral surface of the guide tube 90. For this reason, in the lens tube 2, the one-group retaining tube 80 and the guide tube 90 are separated from each other on a portion where the friction spring 94 is disposed, but they move closer to each other on a portion in a radial direction opposite to the former portion.

In the lens tube 2 according to the second embodiment, rattling caused between the male helicoid 91 and the female helicoid 81 is suppressed, and the transfer of the first lens group L3 due to a change in the posture of the camera 2 is suppressed. In the lens tube 2 according to the second embodiment, since the friction spring 93 generates a pushing force to the radial direction of the lens tube 2 similarly to the lens tube according to the first embodiment, it always generates an approximately constant pushing force regardless of the position of the first lens group L3 in the optical axis direction. Therefore, the ultrasonic motor is easily controlled, and the first lens group L3 can be stably driven.

Modified Embodiments

The present invention is not limited to the above embodiments, and even the following various modifications and changes can be made and they are included in a technical scope of the present invention.

(1) In the embodiments, the friction spring suppresses rattling of the focus lens group, but the invention is not limited to this, and when the lens tube has another lens group such as zoom lens which transfers to the optical axis direction, such a lens may be used.

(2) In the embodiments, the leaf spring suppresses the rattling of the second lens group, but the pushing member is not limited to this, and a coil spring, for example, may be used. The rattling may be suppressed by an elastic member such as rubber. The pushing member is disposed on a lower side of a direction of gravitational force (−Y direction) when the camera is in a positive position (lateral position) in the example shown in FIG. 1. However, the pushing member is disposed on an upper side of the direction of gravitational force as shown in FIG. 3, a comparatively weak pushing force can be applied.

(3) In the lens tube according to the embodiments, one friction spring suppresses the rattling of the second lens group, but the number of friction springs is not limited to this, and the friction spring may be provided to a plurality of straight guide keys, or not less than two friction springs may be provided along the peripheral direction of the lens retaining frame.

(4) The lens tube according to the embodiments is the interchangeable lens tube attached to a camera body detachably, but the lens tube of the present invention is not limited to this, and one which is integral with the camera body may be used.

(5) In the lens tube according to the embodiments, the lens retainer is driven by the driver including the ultrasonic motor, but the driving system is not limited to this, and another actuator such as a DC motor may be included.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A lens tube comprising:
   a standard member having a standard surface via which the standard member is to be mounted to a camera main body;
   a lens retainer which retains at least one lens and which is connected to the standard member movably along an optical axis of the at least one lens;
   a guide provided facing the lens retainer in a radial direction of the at least one lens to guide the lens retainer along the optical axis; and
   a pushing member configured to provide a pushing force extending along a substantially radial direction with respect to the optical axis to push the lens retainer and the guide in opposite directions substantially radially with respect to the optical axis.

2. The lens tube according to claim 1, further comprising:
   a driver configured to move the lens retainer along the optical axis.

3. The lens tube according to claim 1,
   wherein the lens retainer has a first screw portion and the guide has a second screw portion, the first screw portion and the second screw portion being screwed together, and
   wherein the pushing member generates the pushing force to separate the first screw portion and the second screw portion from each other.

4. The lens tube according to claim 1,
   wherein the guide comprises a straight guide portion which is connected to the standard member and which is configured to guide the lens retainer along the optical axis, and
   wherein the pushing member is supported by the lens retainer and presses the lens retainer to get away from the straight guide portion.

5. The lens tube according to claim 4, wherein the pushing member comprises a leaf spring provided between the lens retainer and the straight guide member.

6. The lens tube according to claim 3, wherein the pushing member comprises a leaf spring provided between the first screw portion and the second screw portion.

7. An optical device comprising:
   the lens tube according to claim 1.

8. A method for producing a lens tube, comprising:
   providing a standard member having a standard surface via which the standard member is to be mounted to a camera main body;
   connecting a lens retainer to the standard member movably along an optical axis of at least one lens, the lens retainer retaining the at least one lens;
   providing a guide facing the lens retainer in a radial direction of the at least one lens to guide the lens retainer along the optical axis; and
   providing a pushing member to provide a pushing force extending along a substantially radial direction with respect to the optical axis to push the lens retainer and the guide in opposite directions substantially radially with respect to the optical axis.

9. The method according to claim 8, further comprising:
   providing a driver configured to move the lens retainer along the optical axis.

10. The method according to claim 9, wherein the driver is an ultrasonic motor.

11. The method according to claim 8, further comprising:
    providing the lens retainer with a first screw portion; and
    providing the guide with a second screw portion,
    wherein the first screw portion and the second screw portion are screwed together, and
    wherein the pushing member generates the pushing force to separate the first screw portion and the second screw portion from each other.

12. The method according to claim 11, wherein the pushing member comprises a leaf spring provided between the first screw portion and the second screw portion.

13. The method according to claim 8,
    wherein the guide comprises a straight guide portion which is connected to the standard member and which is configured to guide the lens retainer along the optical axis, and
    wherein the pushing member is supported by the lens retainer and presses the lens retainer to get away from the straight guide portion.

14. The method according to claim 13, wherein the pushing member comprises a leaf spring provided between the lens retainer and the straight guide member.

15. The method according to claim 8, wherein the lens retainer includes a first surface extending in parallel to the optical axis, wherein said guide includes a second surface extending in parallel to the optical axis and facing the first surface, and wherein the pushing member is provided between the first surface and the second surface and is configured to push the first surface and the second surface in the opposite directions.

16. The lens tube according to claim 2, wherein the driver is an ultrasonic motor.

17. The lens tube according to claim 1, wherein the lens retainer includes a first surface extending in parallel to the optical axis, wherein said guide includes a second surface extending in parallel to the optical axis and facing the first surface, and wherein the pushing member is provided between the first surface and the second surface and is configured to push the first surface and the second surface in the opposite directions.

* * * * *